United States Patent [19]
Visco et al.

[11] Patent Number: 5,882,812
[45] Date of Patent: Mar. 16, 1999

[54] OVERCHARGE PROTECTION SYSTEMS FOR RECHARGEABLE BATTERIES

[75] Inventors: Steven J. Visco, Berkeley; May-Ying Chu, Oakland; Lutgard C. De Jonghe, Lafayette, all of Calif.

[73] Assignee: Polyplus Battery Company, Inc., Berkeley, Calif.

[21] Appl. No.: 782,245

[22] Filed: Jan. 14, 1997

[51] Int. Cl.$^6$ ............................................. H01M 010/44
[52] U.S. Cl. ........................................................ 429/50
[58] Field of Search .............................. 429/50, 112, 49, 429/218, 192, 194, 190; 320/137

[56] References Cited

U.S. PATENT DOCUMENTS

| | | | |
|---|---|---|---|
| 4,324,846 | 4/1982 | Kaun et al. ............................. | 429/112 |
| 4,728,590 | 3/1988 | Redey ..................................... | 429/221 |
| 4,849,309 | 7/1989 | Redey et al. ............................. | 429/50 |
| 5,472,808 | 12/1995 | Peled et al. ............................. | 429/192 |
| 5,536,599 | 7/1996 | Alamgir et al. ........................ | 429/212 |
| 5,686,201 | 11/1997 | Chu ......................................... | 429/52 |

OTHER PUBLICATIONS

Redey, L., "Chemical Mechanism for Overcharge Protection In Lithium–Alloy/Metal Disulfide Cells," Oct. 18–23, 1987, Honolulu, Hawaii, p. 2168, *Extended Abstracts*, vol. 87–2.
Besenhard, et al., "Inorganic Film–Forming Electrolyte Additives Improving the Cycling Behaviour of Metallic Lithium Electrodes and the Self–Charge of Carbon–Lithium Electrodes," Apr. 15, 1993, Lausanne, CH, pp. 413–420, *Journal of Power Sources*, vol. 44.
Brummer, S.B., et al., "Low Temperature Lithium/Sulfur Secondary Battery (Annual Progress Report, Dec. 1, 1974–Dec. 1, 1975)," EIC Corporation, Apr. 1976, Newton, Massachusetts.
Redey, L: Overcharge Protection in Li–Alloy/Metal Disulfide Cells, Proceedings—Electrochemical Society Proc. Jt. Int. Symp. Molten Salts, 87–7, pp. 631–636, 1987 (No month).
Fielder, WL; Singer, J: Solubility, Stability, and Electrochemical Studies of Sulfur–Sulfide Solutions in Organic Solvents, NASA, Scientific and Technical Information Office, 1978 (No Month).
Chu, MY; Visco, S; DeJonghe, L: High Power Lithium Polymer Battery, Paper presented at Wescon 95 Conference, San Francisco, Nov. 7–9, 1995, pp. 1–3 (No month).
Broadhead, J; Buckley, JP: A Safe, Fast Charge 2 Volt Lithium/Polymer AA Cell, Moltech Publication prior to filing of this application (No date).

*Primary Examiner*—Anthony Skapars
*Attorney, Agent, or Firm*—Beyer & Weaver, LLP

[57] ABSTRACT

Disclosed is an electrochemical device having a shuttle-type redox mechanism for overcharge protection in which the redox reaction is "tuned" with a tuning agent to adjust the potential at which the redox reaction occurs. Such device may be characterized as including the following elements: (1) a negative electrode (e.g., lithium); (2) a positive electrode containing one or more intermediate species (e.g., polysulfides) which are oxidized to one more oxidized species during overcharge; and (3) a tuning species (e.g., an organosulfur compound) which adjusts the rate at which the oxidized species are reduced and thereby adjusts the voltage at which overcharge protection is provided. The oxidized species produced during overcharge move to the negative electrode where they are reduced back to said intermediate species as in a normal redox shuttle. However, the oxidized species react more rapidly than the intermediate species at the negative electrode. Thus, the overcharge protection mechanism becomes more active as the oxidized species' concentration increases—as occurs during more severe overcharge.

11 Claims, 4 Drawing Sheets

OVERCHARGE PROTECTION SYSTEMS FOR RECHARGEABLE BATTERIES

BACKGROUND OF THE INVENTION

The present invention relates to electrochemical cells having a mechanism for protecting against damage from overcharge. More specifically, the invention relates to cells in which sulfur or a similarly acting species is oxidized during overcharge at a positive electrode and then shuttles to a negative electrode where it is reduced.

Damage from overcharge presents a significant problem for many secondary batteries. Normal recharging is intended to be carried out until the cell on recharge reaches a defined voltage. If for any reason this voltage is exceeded, overcharge may result. Overcharge can cause various undesirable reactions such as destruction of the cell electrolyte, corrosion of current collectors, degradation of cell separators, and irreversible damage to the positive or negative electrode. Any one of these conditions can lead to the destruction of the cell. Further, overcharge can create unsafe conditions such as cell venting due to electrolyte gassing.

The problem may be especially pronounced when a plurality of electrochemical cells are coupled together in series (e.g., to form a battery or battery pack). Typically, the individual cells will possess at least slightly varying capacities—reflected as the maximum number of coulombs (or ampere-hours) that the cell accept without overcharging. Those cells having lower capacities will become fully charged before other cells having higher capacities. If charging continues after the lower capacity cells reach full charge, the lower capacity cells will overcharge and possibly be damaged.

Various approaches to overcharge protection have been employed. In one approach, a protective additive is provided to the cell. Such additives undergo "parasitic" reactions at cell potentials above the cell's full charge potential but below a destructively high cell potential. Thus, suitable additives are chosen based upon characteristic voltages at which they are oxidized and reduced. If an electrode voltage reaches the additive's characteristic oxidation or reduction potential, the additive begins to react and continues to react until the cell potential recedes to a safe level.

One widely-used class of protective additives is based on the organometallic ferrocene compounds. A given ferrocene may be oxidized at a voltage of about 3 volts (versus a lithium negative electrode) for example. Consider a ferrocene-protected lithium-iron sulfide cell having a normal full charge cell potential of about 1.8 volts. When during charge of such cell, all positive electrode material has been fully oxidized, the cell voltage increases beyond 1.8 volts towards 3 volts. When the cell voltage reaches 3 volts, the ferrocene additive begins to react. Specifically, it is oxidized at the positive electrode. The oxidized compound then travels to the negative electrode where it is reduced. The reduced compound then shuttles back to the positive electrode to again be oxidized. In this manner, the ferrocene provides a shuttle redox mechanism, thereby protecting the cell from attaining too high of a voltage.

As most widely-used redox shuttle additives, like ferrocenes, are cyclic organic compounds, they eventually degrade under the harsh cell environment of a rechargeable alkali-metal cell. Thus, the protection they provide eventually decreases during the cell's life.

Further, because such redox additives invariably react at a given potential, they may sometimes impede normal cell charging. For example, during rapid charging, the cell voltage may slightly exceed the point at which the additive reacts, even though the cell has not been charged to full capacity. When this occurs, the charging current shunts to the additive's redox reaction and away from the desired charging reaction.

At least one inorganic overcharge protective additive has been employed. In the article "Overcharge Protection in Li-Alloy/Metal Disulfide Cells" by L. Redey, Proceedings—Electrochemical Society (Proc. Jt. Int. Symp. Molten Salts), 87-7, pages 631–636, (1987), molten-salt-electrolyte lithium-alloy/metal-sulfide cells employing lithium sulfide as an overcharge protection agent are described. In these cells, the lithium sulfide is soluble in molten electrolyte. During overcharge, it reacts at the positive electrode to produce a lithium polysulfide of relatively low oxidation state. The polysulfide then shuttles to the negative electrode where is it reduced back to sulfide on the lithium alloy. The sulfide additive used in this redox shuttle is more robust in the face of lithium negative electrodes than ferrocenes and other common organic additives. Unfortunately, the protective reaction described in the Redey reference occurs at the rather low voltage of about 1.9 to 2.05 volts. This is lower than the operating voltage for many important cells in use today. Thus, application of the Redey protective mechanism is limited to cells having potentials below about 1.9 volts (e.g., the lithium alloy-iron sulfide molten-salt cell described by Redey).

In view of the above difficulties, what is needed is an improved overcharge protection mechanism employing protective species which (1) resist attack by lithium (or other highly reactive electrode materials), (2) are stable in both the reduced and oxidized states, and (3) do not impede the cell's normal charge and discharge functioning.

SUMMARY OF THE INVENTION

Applicants have recognized that certain electrochemical cells, notably the lithium-sulfur cell, possess an internal overcharge protection mechanism. In accordance with this invention, that mechanism has been harnessed and engineered for application to a wide range of cells operating under a wide range of conditions.

In lithium-sulfur cells, it has been discovered that on overcharge polysulfide species of intermediate oxidation state located in the positive electrode are converted to more highly oxidized polysulfide species. These more highly oxidized species are transported to the negative electrode where they are reduced back to the intermediate polysulfide species. The intermediate polysulfide species so produced then move back to the positive electrode where they are again oxidized to the oxidized polysulfide species. By providing this steady flux of intermediate polysulfide species at the positive electrode, the cell potential is maintained at a relatively low level dictated by the oxidization reaction of the intermediate polysulfide species.

Key to this reaction mechanism is the relative kinetics of the intermediate and highly oxidized polysulfide reactions. The highly oxidized species react much faster than the intermediate species (see FIG. 3 which is described below). Thus, as overcharge conditions become more severe (more oxidizing cell potentials), and thereby produce more highly oxidized polysulfide species, the rate of the protective reaction increases. Under less extreme conditions (lower cell potentials), when overcharge protection is less necessary, the protective reaction operates more slowly.

In one aspect of the present invention, an electrochemical energy conversion device is provided in which a shuttle mechanism (such as the above-described polysulfide mechanism) is "tuned" with a tuning agent which adjusts the potential at which the reaction occurs. Specifically, such device may be characterized as including the following elements: (1) a negative electrode; (2) a positive electrode containing one or more intermediate species which are oxidized to one or more oxidized species during overcharge; and (3) a tuning species which adjusts the rate at which the oxidized species are reduced and thereby adjusts the voltage at which overcharge protection is provided. The oxidized species produced during overcharge move to the negative electrode where they are reduced back to the intermediate species as in a normal redox shuttle. However, the tuning species affects the rate at which the oxidized species reacts at the negative electrode.

The tuning species tailors the overcharge protection voltage to a level that is appropriate for a given cell. For example, if the intermediate species' "native" reaction potential is lower than the normal fully charged cell voltage, the tuning species should slow the protectant's reaction rate to thereby increase the overcharge protection potential. Thus, the tuning species generally may be any material added to adjust the potential at which the conversion between the intermediate species and the more oxidized species occurs.

In one embodiment, the tuning species is an organic sulfur compound of the general formulas RS and $(R(S)_y)_n$, wherein y is a value between 1 and 6, n is a value between about 2 and 1000, and R is one or more different aliphatic or aromatic organic moieties having between 1 and about 20 carbon atoms, which may include one or more oxygen, sulfur, or nitrogen heteroatoms when R comprises one or more aromatic rings, or one or more oxygen, sulfur, nitrogen, or fluorine atoms associated with the chain when R includes an aliphatic chain, wherein the aliphatic group may be linear or branched, saturated or unsaturated, and wherein either the aliphatic chain or the aromatic ring may have substituted groups thereon. Representative compounds include trithiocyanuric acid, thiophene, tetraethylthiuram disulfide $((C_2H_5)_2NC=SS)_2$, polyethylene disulfides (e.g., $(SCH_2CH_2S)_n$, and $C_2H_5S-SC_2H_5$), and mercaptans (e.g., $CH_3SH$).

In a second embodiment, the tuning species is an alloying element added to a primary metal component of the negative electrode. For example, aluminum, silicon, magnesium, or manganese may be added to a lithium metal negative electrode.

In a third embodiment, the tuning species is a "non-reactive" surface active agent selected from the group consisting of boron containing compounds including organoborates such as trimethylborate, boroxines, such as trimethylboroxine, phosphorus containing compounds including polyphosphazenes and phosphates such as $Li_3PO_4$, carbonates such as $Li_2CO_3$, nitrogen containing compounds including nitrates such as $LiNO_3$ and organonitrogen compounds such as phenylhydrazine.

In a fourth embodiment, the tuning species is an electrolyte additive which affects the solubility of the intermediate species and/or oxidized species. If the intermediate and oxidized species are made less soluble (by choosing an appropriate electrolyte), then the potential at which overcharge protection occurs is increased. If the intermediate species are made more soluble (again by choosing an appropriate electrolyte), then the overcharge protection potential is lowered. Electrolytes in which polysulfides, for example, are rather soluble include amides such as acetamide, dimethylacetamide, and 1-methyl-2-pyrollidinone, ketones such as cyclohexanone, lactones such as γ-butyrolactone and γ-valerolactone, sulfones such as sulfolane and 2,4-dimethylsulfolane, sulfoxides such as methyl sulfoxide and tetramethylene sulfoxide, carbonates such as propylene carbonate, ethylene carbonate, diethyl carbonate and dimethyl carbonate, ethers including the ethoxyethers such as the glymes $CH_3O(CH_2CH_2O)_nCH_3$ where n=1 to 5 including penta-glyme $CH_3O(CH_2CH_2O)_5CH_3$, tetra-glyme $CH_3O(CH_2CH_2O)_4CH_3$, tri-glyme $CH_3O(CH_2CH_2O)_3CH_3$, di-glyme $CH_3O(CH_2CH_2O)_2CH_3$, and mono-glyme $CH_3OCH_2CH_2OCH_3$, the polyglymes $CH_3O(CH_2CH_2O)_nCH_3$ where n is between about 6 and 100, the polyoxyethers such as polyethylene oxide $(CH_2CH_2O)_n$ where n is between about 100 and 200,000, and cyclic ethers such as tetrahydrofuran ("THF"), and 2,5-dimethyltetrahydrofuran.

Electrolytes in which polysulfides, for example, are rather insoluble include alkanes such as hexane, heptane, and octane, monocyclic aromatics such as benzene, toluene and xylene, and polycyclic aromatics such as napthalene and perylene. To precisely tune the overcharge protection potential, the electrolyte preferably includes in a combination of one of the poor solvents with one of the good solvents.

In a preferred embodiment, the rechargeable electrochemical energy conversion device includes sulfur or an organosulfide compound as the positive electrode and an alkali or alkaline earth metal as the negative electrode. In the case of a sulfur cell, the intermediate and oxidized species may both be polysulfides of the formula $M_yS_x$, where y=1 or 2, x is greater than or equal to 2, and where the value of x is greater in the oxidized species than in the intermediate species. Preferably, the value of x is greater than or equal to 6 for the oxidized species. In many such sulfur cells, a sulfide film of formula $M_yS$ forms on the negative electrode (e.g., a lithium sulfide film on a negative electrode of lithium or a lithium alloy).

While tuned overcharge protection systems of this invention may be applied to many different cells, they are preferably applied to cells in which the negative electrode is an alkali metal including lithium and its alloys such as lithium aluminum alloys, lithium silicon alloys, and lithium tin alloys; sodium and its alloys such as sodium lead alloys; alkaline earth electrodes such as magnesium and their alloys; transition metal electrodes such as aluminum, zinc, and lead and their alloys; intercalation anodes such as $Li_xC_6$; glass matrix electrodes such as $Li/Sn_2O_3$ and $Li/SiO_2$. Such electrodes may be applied in various cells including lithium/organosulfur cells such as $Li/(SCH_2CH_2S)_n$; lithium/(inorganic sulfur) cells such as $Li/Li_2S_x$; lithium/(metal oxide) cells such as $Li/Li_xMn_2O_4$ and $Li/V_6O_{13}$, lithium/(metal sulfides) cells such as $Li/TiS_2$ and $Li/MoS_2$; and carbon anode cells such as $Li_xC_6/Li_xCoO_2$.

In another aspect, the present invention provides rechargeable electrochemical energy conversion devices in which a sulfur species is provided as an additive to a cell such that the above-described polysulfide shuttle mechanism protects the cells against overcharge. Specifically, such electrochemical energy conversion devices may be characterized as including the following elements: (1) a positive electrode other than a sulfur electrode; (2) a negative electrode; (3) a sulfur-based additive; and (4) an electrolyte in which polysulfide species are substantially soluble and sulfide species are substantially insoluble. The sulfur-based additive includes at least one of elemental sulfur, a sulfide species, and one or more polysulfide species. During overcharge in such cell, a polysulfide species is oxidized to an oxidized polysulfide species which is subsequently reduced by a reaction with the substantially insoluble sulfide species.

Preferably, the polysulfide species has the formula $M_yS_x$ as defined above. Given that the untuned polysulfide shuttle reaction becomes significant at cell potentials around 2.2 to 2.4 volts, electrochemical devices to which the sulfur-based additive is provided preferably have fully charged voltages of at most about 2.5 volts. Of course, a tuning species (as described above) may be employed to adjust the potential at which the oxidized polysulfide species is reduced and thereby adjusts the voltage at which overchargeable protection is provided.

Some preferred devices to which the sulfur-based additive may be provided are polymeric cells (having a polyethylene oxide electrolyte for example). Further, to ensure that the sulfide species remains insoluble in the electrolyte, the device is preferably operated at a temperature of at most about 200° C. (or, in lithium cells, about 180° C.—the melting point of lithium metal).

For this aspect of the invention, suitable negative electrodes include an alkali metal including lithium and its alloys such as lithium aluminum alloys, lithium silicon alloys, and lithium tin alloys; sodium and its alloys such as sodium lead alloys; alkaline earth electrodes such as magnesium and their alloys; transition metal electrodes such as aluminum, zinc, and lead and their alloys; intercalation anodes such as $Li_xC_6$; glass matrix electrodes such as $Li/Sn_2O_3$ and $Li/SiO_2$. Suitable positive electrodes include metal oxides such as $MoO_2$, $MoO_3$, $WO_2$, and $V_6O_{13}$; metal sulfides such as $NiPS_3$, $TiS_2$, and $VS_2$, and organosulfur electrodes such as $(SCH_2CH_2S)_n$, $((C_2H_5)_2NC=SS)_2$, and $C_2H_5S—SC_2H_5$. Thus, cells which may benefit from the sulfur-based additive of this invention include lithium/metal oxide cells such as $Li/MoO_2$ and $Li/V_6O_{13}$; lithium/metal sulfides such as $Li/TiS_2$ cells; lithium/organosulfur cells such as $Li/(SCH_2CH_2S)_n$; carbon anode cells such as $Li_xC_6/TiS_2$ and glass matrix anode cells such as $(Li/Sn_2O_3)/TiS_2$.

Another aspect of the present invention pertains to methods of using the above-described cells to protect against damage from overcharge.

These and other features and advantages of the invention will be described in more detail below with reference to the drawings.

DETAILED DESCRIPTION OF THE PREFERRED EMBODIMENTS

General Points

The present invention provides an overcharge protection system and method for recharging electrochemical cells. In the following description, numerous specific details of the cells and mechanisms are set forth in order to provide a thorough understanding of the present invention. It will be apparent, however, that the present invention may be practiced without limitation to some of the specific details presented herein.

Some suitable materials for use in fabricating certain sulfur-based cells of this invention, as well as fabrication methods employed therewith, are described in U.S. Pat. Nos. 5,523,179 (issued Jun. 4, 1996) and U.S. Pat. No. 5,582,623 (issued Dec. 10, 1996) as well as U.S. patent application Ser. No. 08/686,609 filed Jul. 26, 1996 (attorney docket no. PLUSP003). Each of these patent documents names May-Ying Chu as inventor, is assigned to the assignee of the present invention, and is incorporated herein by reference for all purposes.

Figure 1:
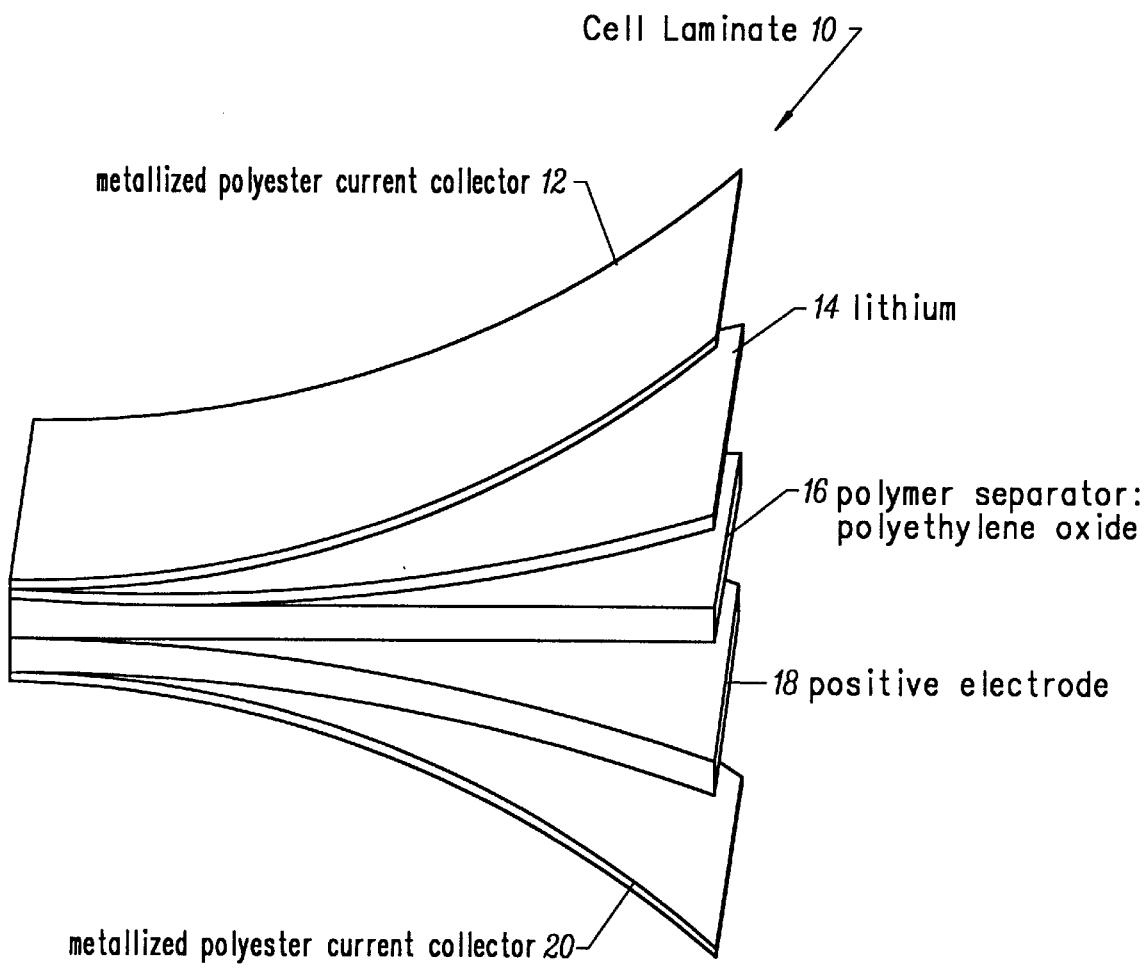
FIG. 1 is an illustration of an arrangement of cell components for a lithium cell which may be employed in a preferred embodiment of the present invention.

Referring now to FIG. 1, a cell laminate 10 in accordance with a preferred embodiment of the present invention is shown. Laminate 10 includes a negative current collector 12 which is preferably formed of a metallized polyester strip. The metallized portion of this element serves to conduct electrons between a cell terminal (not shown) and a negative electrode layer 14 (such as lithium) to which current collector 12 is affixed. The bottom portion of negative electrode 14 is a separator/electrolyte layer 16. Preferably, the separator is a polymer such as polyethylene oxide. Affixed to the bottom of separator layer 16 is a positive electrode layer 18. As layer 16 is chosen to be an electronic insulator and ionic conductor, positive electrode 18 is ionically coupled to but electronically insulated from negative electrode 14. Finally, the bottom of positive electrode layer 18 is affixed to a current collector layer 20. Layer 20 provides an electronic connection between a positive cell terminal (not shown) and positive electrode 18. Preferably, layer 20 is a metallized polyester current collector (like layer 12).

The choice of terms "top" and "bottom" to describe cell laminate 10 was made for ease of description. These terms in no way limit the orientation of the cell or its components.

Cell laminate 10 may be conveniently fabricated by current batch or continuous thin layer techniques such as those described in U.S. Pat. No. 5,582,623, previously incorporated by reference. In a continuous fabrication technique, the a slurry of positive electrode material may be continuously applied by a suitable coating apparatus, such as a doctor blade, to a sheet of current collector. The resulting positive electrode/current collector may be bonded to the other layers of the cell by continuously providing the individual layer to a set of rollers operated at a sufficiently high temperature to bond the individual layers one to another. Using such techniques, which are well known in the art, laminate 10 may be produced with a total thickness on the order of 100 micrometers or thinner.

Cell laminate 10 is but one of many cell designs to which the present invention may be employed. Other appropriate cell designs include spirally wound ("jelly roll") designs, prismatic designs, coin cell designs, etc. Methods of preparing each of these cell types are well known in the art. Further, any of the electrodes and electrolytes may be solids, gels, or liquids.

Figure 2:
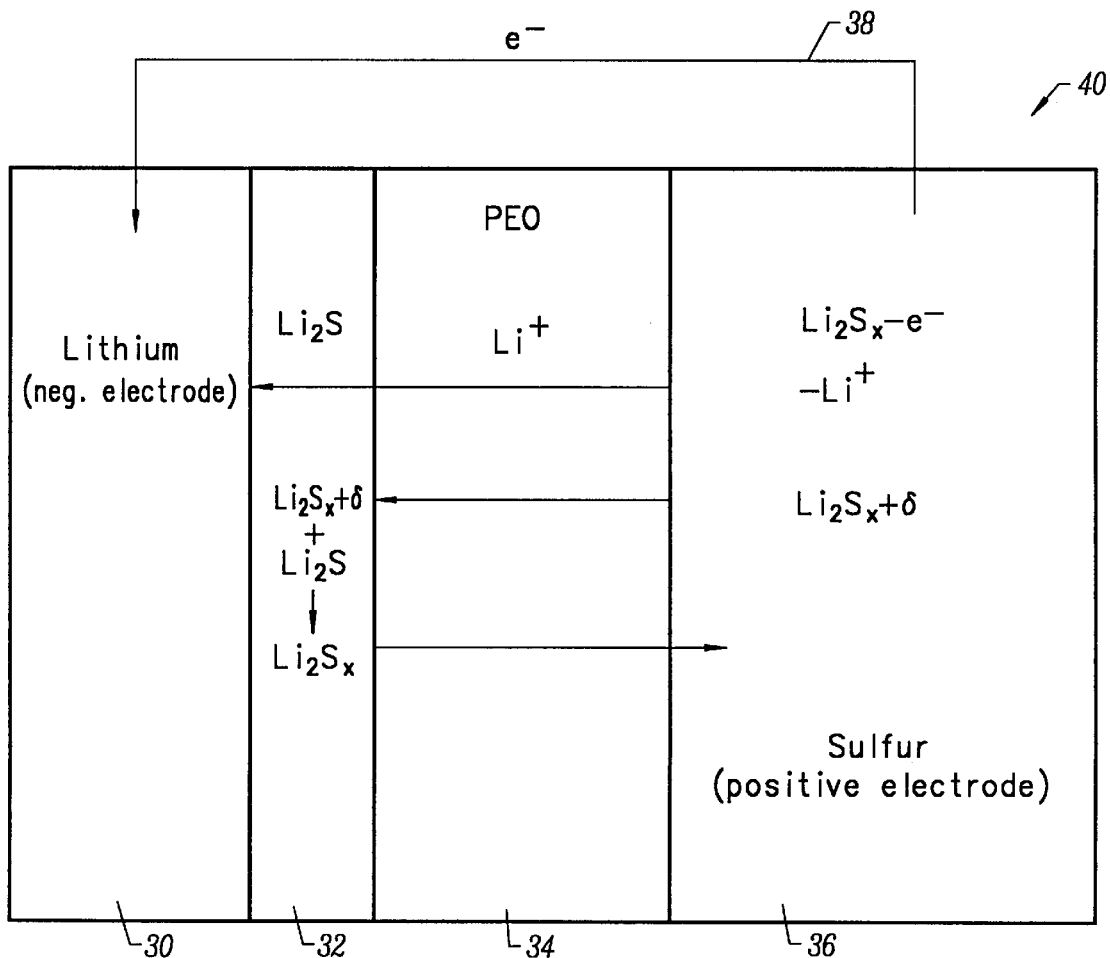
FIG. 2 is a mechanistic representation of an internal polysulfide overcharge protection mechanism of a lithium-sulfur cell.

Referring now to FIG. 2, a lithium-sulfur cell 40 is shown with relevant overcharge protection mechanisms depicted. Cell 40 includes a lithium metal negative electrode 30, a polyethylene oxide separator/electrolyte 34, and a sulfur positive electrode 36. Lithium electrode 30 includes a lithium sulfide (Li$_2$S) passivation layer 32 formed adjacent to separator 34. During normal charge, the electrons are extracted from positive electrode 30 and transported over an electrical connection 38 to negative electrode 30. The removal of electrons at positive electrode 36 oxidizes the species present in the electrode. In this reaction, lithium ions are liberated from lithium sulfide and/or lithium polysulfide species present in the positive electrode. The species remaining in the positive electrode will have the general formula Li$_2$S$_x$, where x has a value of 2 or greater. Over time the charge reaction produces polysulfide species having longer and longer sulfur chains. It is known for example that in a normal charge reaction, the value of x in some polysulfides may be 12 or greater.

At the negative electrode, lithium ions present in the electrolyte 34 and passivation layer 32 are reduced to lithium metal as electrons are provided to negative electrode 30 through electrical conduit 38.

At a fully charged cell potential (typically in the neighborhood of 2.2 to 2.4 volts), charging normally ceases. If charging could continue, the cell would overcharge with the potential continuing to increase to a level where deleterious side reactions occur. However, the internal overcharge protection mechanism of the lithium-sulfur cell normally prevents such deleterious reactions. Specifically, as charging current is continually introduced into positive electrode 36, more highly oxidized lithium polysulfide species are produced. In FIG. 2, these species are represented by the formula Li$_2$S$_{x+\delta}$.

As these highly oxidized polysulfide species are generated, their concentration increases in the vicinity of the positive electrode 36. As a result, a concentration gradient is established and the soluble highly oxidized species are driven away from positive electrode 36 toward passivation layer 32 by diffusion. Other transport mechanisms may facilitate movement of these polysulfides. When the highly oxidized polysulfide species reach passivation layer 32, they react with insoluble lithium sulfide (Li$_2$S) to produce intermediate oxidized species of formula Li$_2$S$_x$. As these intermediate polysulfide species buildup in the vicinity of passivation layer 32, they move back to positive sulfur electrode 36. There, the intermediate species may be reoxidized to oxidized polysulfide species (Li$_2$S$_{x+\delta}$) if overcharge conditions persist. This polysulfide redox shuttle mechanism appears to be intrinsic to lithium-sulfide cells in which polysulfides are soluble to some extent in the electrolyte.

Figure 3:
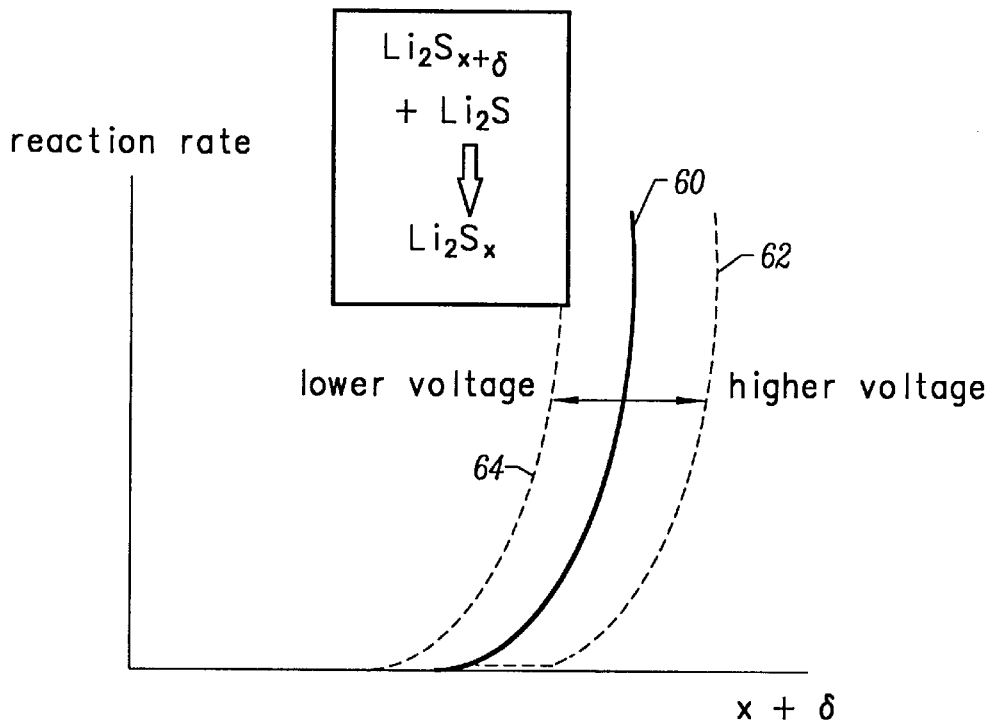
FIG. 3 is a graph showing how reaction rate increases with oxidation level of polysulfides (or other appropriate overcharge protectant) in accordance with the present invention.

The more highly oxidized polysulfide species react faster than the less oxidized species (i.e., lithium sulfide and the intermediate oxidized lithium polysulfides). FIG. 3 presents a curve showing how reaction rate of a polysulfide varies as a function of the polysulfide anion's stoichiometric coefficient, x+δ. As the value of x+δ increases beyond a certain point, the reaction rate quickly climbs to a very high level. Thus, as overcharge conditions become more severe and the value of x+δ increases, the overcharge protection reaction speeds up to counter the effects of overcharge.

Note that the less oxidized species react quite slowly, if at all, with the negative electrode. If this were not the case, the cell might continuously self discharge after charging. The soluble charged species from the positive electrode would simply move to the negative electrode where they would be reduced and therefore unavailable for participation in the electrochemical reactions necessary to produce electrical energy.

Note also that the highly oxidized polysulfide species react readily with lithium metal as well as less oxidized polysulfides. As a result, the highly oxidized polysulfides may scavenge lithium metal dendrites that may form and break off during normal cycling. As understood in the field, such metallic dendrites are sometimes responsible for shortening the life of rechargeable lithium metal cells. Because the polysulfide species chemically react with lithium metal and thereby reintroduces it to the cell's productive electrochemical cycle, the cells of this invention generally have longer cycle lives than comparable lithium metal cells.

Regarding the species involved in the protective redox shuttle, it is believed that the more oxidized overcharge products from the positive electrode are lithium polysulfides in which x is greater than 3 (or (x+δ)>3 in the representation employed in FIGS. 2 and 3) and more likely in which 6<x<20. The reactivity of the polysulfides appears to increase significantly when x>6.

As the above mechanism is based upon a shuttling between intermediate and oxidized polysulfide species, it operates at a higher potential than mechanisms shuttling between lithium sulfide and lithium polysulfides (the shuttle described in the Redey article). Note that in the molten salt electrolyte systems employed by Redey, lithium sulfide, as well as lithium polysulfides, are extremely soluble. In the systems of this invention, lithium sulfide (and possibly some of the less oxidized polysulfides) will generally be insoluble and remain as part of passivation layer 32 (at least during the critical overcharge stage).

Further, the above-described polysulfide mechanism should be contrasted with conventional overcharge protection schemes in which a parasitic additive is provided to the cell. Such additives are chosen based upon characteristic voltages at which they are oxidized and reduced. The protection mechanisms of the present invention are, in contrast, based upon a composition rather than voltage. Only after all sulfur species are sufficiently oxidized (e.g., with x being approximately 6 or greater), will the overcharge mechanism of this invention be activated. Thus, the problem of shunting charging current to a parasitic redox reaction during rapid charging will not arise in the composition dependent mechanism of the present invention. As long as there is additional active-sulfur in a limited oxidation state, the charging reaction will proceed—regardless of whether the cell voltage slightly exceeds the normal fully charged cell voltage.

Generally, any cell species (polysulfide or otherwise) having a series of oxidization states, in which the lower oxidation states react more slowly than the higher more oxidized species, will provide the desired inherent overcharge protection mechanism. Thus, suitable cells for use with this invention include lithium/organosulfur cells such as Li/(SCH$_2$CH$_2$S)$_n$; lithium/(inorganic sulfur) cells such as Li/Li$_2$S$_x$; lithium/(metal oxide) cells such as Li/Li$_x$Mn$_2$O$_4$ and Li/V$_6$O$_{13}$, lithium/(metal sulfides) cells such as Li/TiS$_2$ and Li/MoS$_2$; and carbon anode cells such as Li$_x$C$_6$/Li$_x$CoO$_2$.

In general, oxidized overcharge products produced in the positive electrode near or at the end of the charging cycle travel to the negative electrode and there react at the electrode surface. In many cells, these overcharge products are reactive with the a passivation layer (on the negative electrode surface) which consists, in part or whole, of less oxidized species. A reaction between the more oxidized overcharge products and the passivation layer compounds reduces the overcharge products. Reduced species may then travel to the positive electrode where they may be reoxidized before returning to the negative electrode. Thus, it appears that a redox shuttle mechanism that gradually removes or reduces the thickness of the negative electrode passivating layer protects the battery from overcharge.

Tuning the Potential at which Overcharge Protection is Triggered

As noted, the intrinsic overcharge protection mechanism afforded by the above-described polysulfide shuttle is provided at about 2.2 to 2.4 volts. This voltage is dictated by the shape of the curve shown in FIG. 3. In a simple lithium-sulfur cell, the intrinsic reaction rate curve may take the form of curve 60. This reaction curve will have a particular voltage associated therewith by virtue of the speed at which oxidized polysulfide species react. If the curve is shifted to the right as shown by curve 62, no significant reaction would occur until even more highly oxidized polysulfide species were produced. As the more highly oxidized polysulfide species are generated only at higher overcharge voltages, the potential associated with curve 62 would be higher than the potential associated with curve 60. If a cell additive corresponding to curve 60 provides an overcharge protection mechanism triggered at 2.2 to 2.4 volts, the overcharge mechanism associated with curve 62 might be triggered at a potential of 2.6 to 2.8 volts.

Similarly, if curve 60 is shifted to the left as shown with curve 64, less oxidized polysulfide species will react more rapidly. As the less oxidized species are produced at lower voltages (than the species associated with curve 60), a cell exhibiting curve 64 would have an overcharge protection mechanism triggered at a relatively low voltage (e.g., 1.8 to 2.0 volts).

In a preferred embodiment, a "tuning species" is added to an electrochemical energy conversion device of this invention in order to shift a cell's intrinsic reaction rate curve (e.g., curve 60 of FIG. 3) to the left or right. This controls the potential at which the overcharge protection mechanism is triggered. While many different tuning species may be appropriate for adjusting the voltage in a desired direction, those of skill in the art will understand that a suitable tuning species for a particular application may be identified with routine screening techniques.

Further, careful choice of solvent can tune the potential at which overcharge protection begins. In general, solvents which increase the solubility of $Li_2S_x$ species (with low x values) lower the potential at which overcharge protection begins. In contrast, solvents which decrease the solubility of such species, increase the potential at which overcharge protection begins. This can be understood by realizing that until a species is soluble in the electrolyte, it cannot shuttle between electrodes and provide overcharge protection. Thus, if a polysulfide (say $Li_2S_3$) produced at the negative electrode is insoluble, it cannot move to the positive electrode and provide overcharge protection. Only when the soluble more oxidized species are produced at the negative electrode (because even more oxidized species are produced at the positive electrode) can the overcharge protection begin. Thus, the overcharge protection potential is relatively high.

To further illustrate this concept, consider the following list of sulfide/polysulfide reactions at the negative electrode:

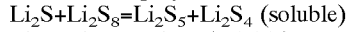
$Li_2S+Li_2S_8=Li_2S_5+Li_2S_4$ (soluble)
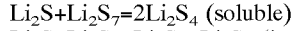
$Li_2S+Li_2S_7=2Li_2S_4$ (soluble)
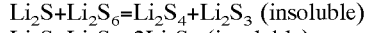
$Li_2S+Li_2S_6=Li_2S_4+Li_2S_3$ (insoluble)
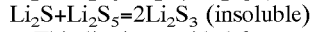
$Li_2S+Li_2S_5=2Li_2S_3$ (insoluble)

This list is provided for an arbitrary solvent that solubilizes $Li_2S_4$, but does not solubilize $Li_2S_3$. As potential rises at the positive electrode, some $Li_2S_5$ is formed and dissolves in the electrolyte. It then moves to the negative electrode where it reacts with the $Li_2S$ film on the lithium electrode to form insoluble $Li_2S_3$ which is unavailable to shuttle to the positive electrode and oxidize. As potential rises further, some $Li_2S_6$ forms at the positive electrode and moves over to the negative electrode where it reacts with the $Li_2S$ film on the lithium electrode to form insoluble $Li_2S_3$ and soluble $Li_2S_4$. Thus, some $Li_2S_4$ can shuttle back to the positive electrode for oxidation. The $Li_2S_3$ is of course unavailable for reaction.

Finally, as the potential rises to the level where $Li_2S_7$ and more oxidized species form, these species move from the positive electrode to the negative electrode where they form less oxidized but soluble polysulfides as indicated by the top two reaction equations above. Thus, the cell potential should stabilize.

If the electrolyte is modified such that $Li_2S_4$ is insoluble, then the stable overcharge potential will be higher. If on the other hand, the electrolyte solubilizes $Li_2S_3$, the stable overcharge potential will be lower.

It should be understood that the above reaction list is not exhaustive. As lithium compounds other $Li_2S$ will be present on the negative electrode surface, these other compounds will participate in the local reactions. Also, many non-stoichiometric reactions should be considered.

This invention provides cells having electrolytes chosen to tune the potential at which overcharge protection begins. Effective solvents for $Li_2S_x$ tend to have large donor numbers ("DN") as measured by the Gutmann Donor Number; this measures the ionizing strength of a solvent. In addition, good solvents for $Li_2S_x$ need to have strong dissociating power as indicated by the dielectric constant ($\epsilon$). For example, diethylacetamide has both a high donor number (DN=27.8) and a large dielectric constant ($\epsilon$=37.8) and, as expected, is an effective solvent for $Li_2S_x$. Tetrahydrofuran has a relatively low dielectric constant ($\epsilon$=7.58), but a large donor number (DN=20.0), and is a good solvent for $Li_2S_x$. Unfortunately, donor numbers and dielectric constants may not be available for many potential solvents and non-solvents. Therefore, in many cases solubility must be experimentally determined.

Appropriate electrolytes can be identified by measuring the solubility of various polysulfides in chosen solvents. Fielder and Singer ("SOLUBILITY, STABILITY, AND ELECTROCHEMICAL STUDIES OF SULFUR-SULFIDE SOLUTIONS IN ORGANIC SOLVENTS", NASA, Scientific and Technical Information Office (1978)) presents solubilities of sodium polysulfides in various solvents. This reference is incorporated herein by reference for all purposes.

Electrolytes in which polysulfides, for example, are rather soluble include amides such as acetamide, dimethylacetamide, and 1-methyl-2-pyrollidinone, ketones such as cyclohexanone, lactones such as γ-butyrolactone and γ-valerolactone, sulfones such as sulfolane and 2,4-dimethylsulfolane, sulfoxides such as methyl sulfoxide and tetramethylene sulfoxide, carbonates such as propylene carbonate, ethylene carbonate, diethyl carbonate and dimethyl carbonate, ethers including the ethoxyethers such as the glymes $CH_3O(CH_2CH_2O)_nCH_3$ where n=1 to 5 including penta-glyme $CH_3O(CH_2CH_2O)_5CH_3$, tetra-glyme $CH_3O(CH_2CH_2O)_4CH_3$, tri-glyme $CH_3O(CH_2CH_2O)_3CH_3$, di-glyme $CH_3O(CH_2CH_2O)_2CH_3$, and mono-glyme $CH_3OCH_2CH_2OCH_3$, the polyglymes $CH_3O(CH_2CH_2O)_nCH_3$ where n is between about 6 and 100, the polyoxyethers such as polyethylene oxide $(CH_2CH_2O)_n$ where n is between about 100 and 200,000, and cyclic ethers such as tetrahydrofuran ("THF"), and 2,5-dimethyltetrahydrofuran.

Electrolytes in which polysulfides, for example, are rather insoluble include alkanes such as hexane, heptane, and octane, aromatics such as toluene and xylene, and polycyclic aromatics such as napthalene and perylene. Preferably the electrolyte includes in a combination of one of the poor solvents with one of the good solvents.

To tune accurately solubility, the electrolyte preferably includes at least one good solvent and at least one poor solvent. Thus, in a polysulfide cell, the electrolyte preferably includes a solvent from the above list of good solvents and a solvent from the list of poor solvents. This is contrary to most cell design criteria which suggest the use of only good solvents. Note that the chosen electrolyte should not solubilize lithium sulfide.

One specific example of a tuning species is an alloying element added to a metal negative electrode. For example, magnesium or aluminum may be added a lithium negative electrode in a concentration of about 10 to 20 percent by weight. Such alloying elements will generally decrease the cell potential and therefore increase (relative the cell potential) the overcharge protection potential. They may also speed up or slow down the speed at which the polysulfides react at the negative electrode.

Another example of a tuning agent is a surface active agent which participates in the reduction reaction. For example, any of a number of organo-sulfur compounds may be used to tune the reaction rate. The following organo-sulfur compounds can be expected to affect the reaction rate (thereby raising or lowering the overcharge protection potential): compounds of the general formulas RS and $(R(S)_y)_n$, wherein y is a value between 1 and 6, n is a value between about 2 and 1000, and R is one or more different aliphatic or aromatic organic moieties having between 1 and about 20 carbon atoms, which may include one or more oxygen, sulfur, or nitrogen heteroatoms when R comprises one or more aromatic rings, or one or more oxygen, sulfur, nitrogen, or fluorine atoms associated with the chain when R includes an aliphatic chain, wherein the aliphatic group may be linear or branched, saturated or unsaturated, and wherein either the aliphatic chain or the aromatic ring may have substituted groups thereon. Representative compounds include trithiocyanuric acid, thiophene, tetraethylthiuram disulfide $((C_2H_5)_2NC=SS)_2$, polyethylene disulfides (e.g., $(SCH_2CH_2S)_n$, and $C_2H_5S-SC_2H_5$), and mercaptans (e.g., $CH_3SH$). It should be understood that many of these additives actually shuttle or cycle between the positive and negative electrodes in manner analogous to the polysulfide species.

Further, these species may have a profound effect on the surface chemistry of the negative electrode. Consider the following reaction at the negative electrode:
$Li_2S+RSSR=LiSSR$ (soluble)+LiSR (insoluble). 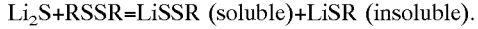

If an insoluble LiSR film is formed on the electrode surface, it will affect the reactivity of the polysulfides with the electrode film and thereby shift the overcharge potential.

Another class of tuning agent is the surface active agents that do not participate in the shuttle reaction. Examples of such surface active agents which increase or decrease a reaction rate include surface active agent selected from the group consisting of boron containing compounds including organoborates such as trimethylborate, boroxines, such as trimethylboroxine, phosphorus containing compounds including polyphosphazenes and phosphates such as $Li_3PO_4$, carbonates such as $Li_2CO_3$, nitrogen containing compounds including nitrates such as $LiNO_3$ and organonitrogen compounds such as phenylhydrazine.

Figure 4:
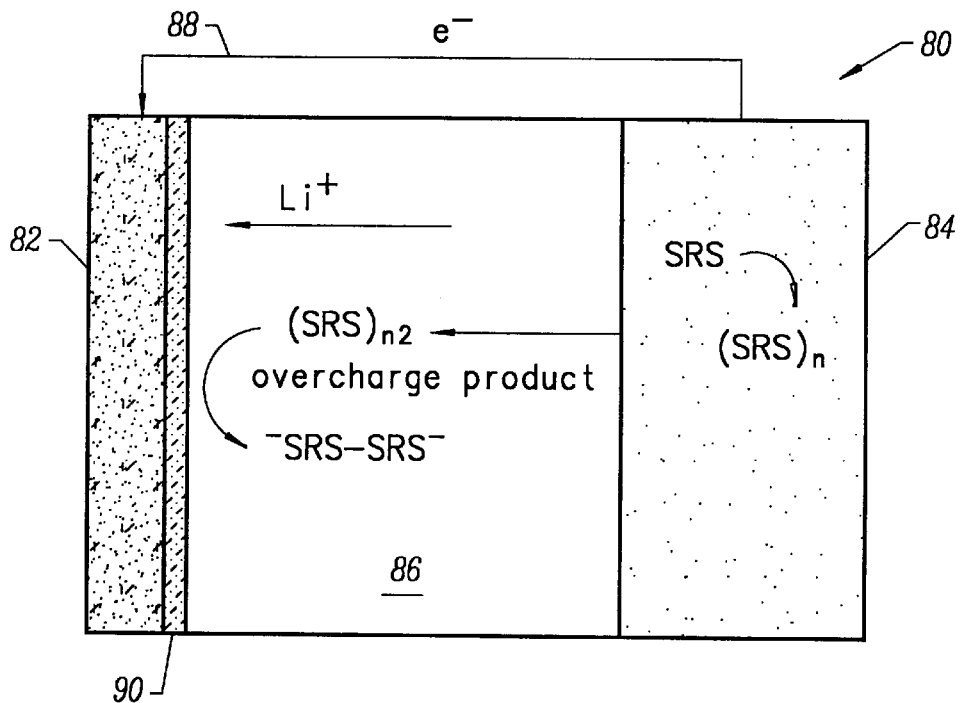
FIG. 4 is a mechanistic representation of an internal overcharge mechanism believed to exist in lithium-organodisulfide cells.

As noted, the above-described tuned overcharged protection mechanism can be employed in systems other than the polysulfide system. In general, any cell having a species produced on overcharge that has multiple oxidation states in which the speed of reaction increases with increasing oxidation state can be employed with the present invention. One class of cells meeting this requirement is the lithium-organodisulfide cell. Turning now to FIG. 4, an organodisulfide cell 80 includes a lithium negative electrode 82, an organodisulfide positive electrode 84, and a polymeric separator 86 disposed between negative electrode 82 and positive electrode 84. During charge, electrons are removed from positive electrode 84 and supplied to electrode 82 over an electrical conduit 88. As part of the normal charge process, lithium ions are liberated from lithium organodisulfide compounds in positive electrode 84. The resulting lithium ions are transported to negative electrode 82 where they are reduced to lithium metal. The organodisulfide anions at the positive electrode form chains of organodisulfide polymers. Upon reaching overcharge, organodisulfide species of a certain relatively high oxidation state begin reacting with negative electrode 82 where they are reduced to a less oxidized species. Generally, the reduced species will simply be a shorter chain organodisulfide polymers.

Most likely, the lithium negative electrode 82 includes a passivation layer 90 similar to layer 32 shown in the lithium-sulfur cell of FIG. 2. Upon being reduced at surface film 90, the organodisulfide anion moves back to positive electrode 84 where it can be reoxidized if overcharge conditions persist. Thus, the organodisulfide shuttle mechanism acts much like the above-described polydisulfide shuttle mechanism. It is believed that the reaction rate of the organodisulfide anions increases with oxidation state, just as in the case of polysulfide anions.

While not wishing to bound by theory, it is believed that the large highly oxidized polyorganodisulfide anions produced during overcharge may form circular or cyclic structures. This would allow them to maintain a high degree of mobility even though their chain length has substantially increased during charging. Regardless of whether or not this is the actual physical mechanism, the highly oxidized species produced during overcharge should be able to travel across the cell separator to the negative electrode.

Other systems in addition to the lithium-sulfur and lithium-organodisulfide cells having the necessary reaction rate profile for oxidized species include lithium/(metal oxide) cells such as $Li/Li_xMn_2O_4$ and $Li/V_6O_{13}$, lithium/(metal sulfides) cells such as $Li/TiS_2$ and $Li/MoS_2$; and carbon anode cells such as $Li_xC_6/Li_xCoO_2$.

Preferably, the overcharge protection of this invention limits the cell voltage during overcharge to a safe level that does not substantially exceed the normal fully charged cell voltage. Thus, the overcharge voltage should remain below the level at which damage is done to cell components. For example, the overcharge voltage should not cause (i) the electrolyte to electrolyze, (ii) the current collectors to corrode rapidly, (iii) the cell separator to degrade rapidly, and (iv) the positive electrode to be irreversibly damaged. Preferably, the overcharge cell voltage will not exceed the normal fully charged cell voltage by more than about 4 volts, more preferably by not more than about 2 volts, and most preferably by not more than about 1 volt.

It should be understood that the value of the "fully charged cell voltage" is not necessarily constant between any two similarly constructed cells or is even constant for a given cell over that cell's life. Obviously, there will be some chemical and/or structural variations from cell to cell that will cause the fully charged cell voltage to vary. In addition, metal-sulfur cells sometimes exhibit gradual (or abrupt) changes in cell voltage over normal cycling. In all cases, the overcharge protection afforded by the present invention can be characterized as a limitation in the deviation from the value of the fully charged cell voltage.

Sulfur Additives for Providing Overcharge Protection

Cells that might not otherwise have robust overcharge protection mechanisms can employ sulfur-based additives in accordance with this invention to provide suitably robust overcharge protection. The polysulfide overcharge shuttle described above may be employed to provide overcharge protection triggered at a potential centered around 2.2 to 2.4 volts (versus lithium metal). This voltage can be tuned upward or downward by suitable tuning additives as described above. These additives are simply provided along with the sulfur-based material as an overcharge protection additive (or as part of the electrodes as appropriate). If a given cell requiring overcharge protection has a normal fully charged cell potential slightly below that of a tuned polysulfide shuttle, overcharge protection may be afforded by adding sulfur, a sulfide, a polysulfide (i.e., the sulfur-based additives), and possibly one or more suitable tuning agents to the cell.

Generally, the parameters described above for the tuned overcharge protection embodiment (especially as applied to polysulfide systems) apply equally to the sulfur-based additive embodiment described here. Thus, within the cell, the sulfur-based species will adopt the formula $M_yS_x$ as defined above, with the value of x varying as the species undergoes redox reactions in accordance with the overcharge protection mechanisms. Note, however, that the sulfur must be supplied as an additive and does automatically form from the electrode materials during charge/overcharge. Further, the sulfur-based additives may be provided with or without a tuning agent.

Figure 5:
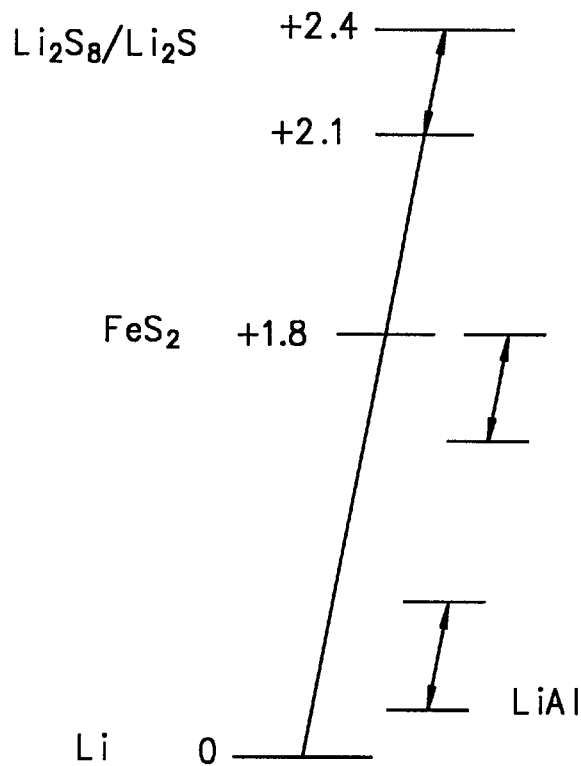
FIG. 5 is an illustration of the potential at which various cell mechanisms of relevance to the present inventions occur.

FIG. 5 depicts potential ranges of interest for lithium-sulfur and lithium-iron disulfide cells. The lithium-sulfur cell has a fully charged cell potential near 2.1 volts. To the extent sulfur or polysulfides participate in the overcharge protection mechanism, these compounds afford protection at up to about 2.4 volts. Thus, polysulfide is an adequate overcharge protectant for lithium-sulfur cells. Of course, sulfur is inherently present in such cells and so need not be added separately. Lithium/(iron disulfide) cells have a cell potential of about 1.8 volts (varying from about 1.8 volts on full charge to about 1.5 volts on discharge) as shown in FIG. 5. Thus, the polysulfide shuttle, centered around 2.2 to 2.4 volts, will provide overcharge protection without interfering in the normal functioning of the lithium/iron disulfide cell. It may be desirable to lower the potential of the polysulfide shuttle to a level closer that of iron-disulfide. Thus, one embodiment of the present invention includes a lithium/iron disulfide cell having as additives a small amount (e.g., several mAhrs) of sulfur/polysulfide and a tuning agent for speeding up the polysulfide reduction reaction to thereby lower the potential at which overcharge mechanism is triggered.

The $Li_2S_x$ additive will react at the lithium electrode surface to produce the appropriate reduced $Li_2S_x$ film (insoluble). On charge, the cell will charge to full capacity, then climb to the voltage of the overcharge shuttle (e.g., about 2.2 volts), and continuously overcharge at a flat potential until cessation of charging.

FIG. 5 also illustrates that certain alloys of lithium such as lithium aluminum have a potential slightly higher than of un-alloyed lithium metal. Such negative electrodes, when coupled with a positive electrode of suitable potential, may also be protected with the polysulfide additive of this invention.

Cells which can profit from sulfur-based additives in accordance with this invention may have such negative electrodes as an alkali metal including lithium and its alloys such as lithium aluminum alloys, lithium silicon alloys, and lithium tin alloys; sodium and its alloys such as sodium lead alloys; alkaline earth electrodes such as magnesium and their alloys; transition metal electrodes such as aluminum, zinc, and lead and their alloys; intercalation anodes such as $Li_xC_6$; glass matrix electrodes such as $Li/Sn_2O_3$ and $Li/SiO_2$. The glass matrix electrodes are described in various references such as Tahara et al., European Patent Application No. 93111938.2 (1993), Idota et al. Canadian Patent Application, 21134053 (1994), and I. Courtney et al. Meeting Abstacts of the Electrochemical Society, Fall Meeting, San Antonio, Tex., Oct. 6–11, 1996 Vol. 96-2, Abstract #66, page 88, each of which is incorporated herein by reference for all purposes. Positive electrodes suitable for use with these negative electrodes include metal oxides such as $MoO_2$, $MoO_3$, $WO_2$, and $V_6O_{13}$; metal sulfides such as $NiPS_3$, $TiS_2$, and $VS_2$, and organosulfur electrodes such as $(SCH_2CH_2S)_n$, $((C_2H_5)_2NC=SS)_2$, and $C_2H_5S-SC_2H_5$. Thus, cells which may benefit from the sulfur-based additive of this invention include lithium/metal oxide cells such as $Li/MoO_2$ and $Li/V_6O_{13}$; lithium/metal sulfides such as $Li/TiS_2$ cells; lithium/organosulfur cells such as $Li/(SCH_2CH_2S)_n$; carbon anode cells such as $Li_xC_6/TiS_2$ and glass matrix anode cells such as $(Li/Sn_2O_3)/TiS_2$. The electrodes are preferably solids or gels.

All cell components may have various forms. For example, the electrolyte may be a polymer (e.g., polyethylene oxide), a gel, or a liquid. Examples of suitable electrolytes include but are not limited to organic carbonates such as propylene carbonate, ethylene carbonate, and dimethyl carbonate; ethers such as tetrahydrofuran, dimethyl ether, polyethylene oxides of high and low molecular weights (i.e., glyme, di-glyme, tri-glyme, and polyethylene oxide, and other polymeric ethers such as oxymethylene linked polyoxyethylene and methoxyethoxy polyphosphazene; sulfoxides such as dimethyl sulfoxide; sulfones such as dimethylsulfone; acetamides such as dimethylacetamide; aromatics such as toluene and xylene; solvent mixtures, and solvents and/or solvent mixtures where gelling agents are included to induce gelation of the solvent system.

It should be noted that the sulfur/polysulfide additives of the present invention provide a higher voltage overcharge protection mechanism than the sulfide/polysulfide system described in the Redey publication described above. In the molten salt system employed by Redey, lithium sulfide is soluble and automatically reacts at the positive electrode to produce a polysulfide of relatively low oxidation state. This low level oxidized species then reacts at the negative electrode to be reduced back to sulfide. This shuttle occurs at an inherently lower voltage than the intermediate/highly oxidized polysulfide shuttle of the present invention. The present invention has the further advantage of being applicable to commercially important cells operating at temperatures below 200° C. (e.g., room temperature).

A sulfur-based additive of this invention may be added to a cell by various techniques. For example, a lithium electrode is coated with a thin film of sulfur which converts to $Li_2S$. Alternatively, $Li_2S_x$ is added to the electrolyte to form the $Li_2S$ layer on the lithium negative electrode in situ. In another embodiment, elemental sulfur is formulated in the positive electrode mix so that on initial discharge, $Li_2S_x$ is formed and migrates to the lithium electrode where a film is formed. In any of the above approaches, a tuning agent may be provided with the sulfur or polysulfide additive. Further, the methods may be used in combination to ensure that sufficient additive is available.

Sulfur Additives for Preventing Self-Discharge

Another aspect of this invention provides a system and method for protecting against self-discharge of a battery. Self-discharge occurs when the state of charge of a battery's electrodes is reduced by a chemical reaction within the cell—while the cell is unconnected to a load.

To better understand self-discharge, consider the reactivity versus composition curves in FIG. 3. These curves indicate that as a compound's level of oxidation (x+δ) increases, its reaction rate also increases. Nevertheless, the curves change over a wide composition range. So even at lower oxidation states (corresponding to lower values of x+δ), some reaction occurs. It is this finite reaction rate that causes the cell to self-discharge. Of course, self discharge occurs most rapidly when the cell is highly charged.

Figure 6:
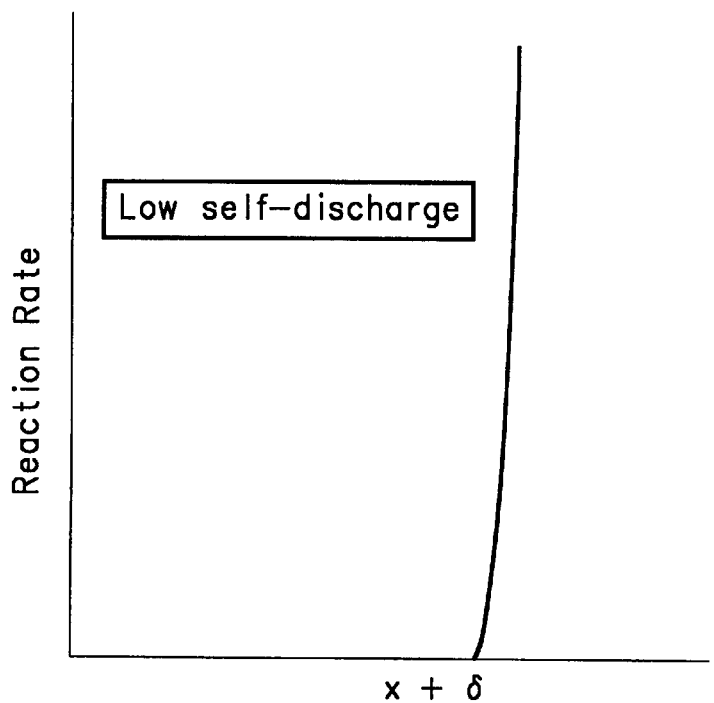
FIG. 6 is a graph showing how reaction rate abruptly increases with oxidation level in a preferred battery which exhibits a low self discharge rate.

To minimize self-discharge, the present invention provides for systems in which the reaction rate is negligible even at less oxidized states. Such systems are illustrated in FIG. 6, for example. As shown, the reaction rate versus composition curve is very steep, such that self-discharge is negligible until the electrode composition reaches that which allows overcharge.

Those of skill in the art will recognize that various of the sulfur and tuning additive compositions described above can be tailored to produce positive electrode material having a steep reaction versus composition profile as illustrated in FIG. 6. In one embodiment, this is accomplished by using a solvent system which leads to such reactivity curves. To ascertain appropriate systems, corrosion studies may be carried out to determine solvent system and/or tuning agent combinations in which the reactivity of $Li_2S_{x+\delta}$ with $Li_2S_x$ films on the negative electrode fall off very sharply with changing values of δ.

Conclusion

Although the foregoing invention has been described in some detail for purposes of clarity of understanding, it will be apparent that certain changes and modifications may be practiced within the scope of the appended claims. Therefore, the present embodiments are to be considered as illustrative and not restrictive, and the invention is not to be limited to the details given herein, but may be modified within the scope of the appended claims.

What is claimed is:

1. A method of protecting against damage from overcharge, the method comprising:

providing a rechargeable electrochemical energy conversion device including a negative electrode, a positive electrode, and a tuning species which adjusts the rate at which oxidized species produced during charging at the positive electrode are reduced and thereby adjusts the voltage at which overcharge protection is provided; and overcharging the rechargeable electrochemical energy conversion device, whereby one or more intermediate species of intermediate oxidation state at the positive electrode are oxidized to one or more oxidized species of higher oxidation state, which oxidized species move to said negative electrode where they are reduced back to said intermediate species, wherein the oxidized species react at a faster rate than the intermediate species at the negative electrode.

2. The method of claim 1, wherein the rechargeable electrochemical energy conversion device's voltage during overcharge does not exceed about 2 volts over the device's fully charged voltage.

3. The method of claim 2, wherein the rechargeable electrochemical energy conversion device's voltage during overcharge does not exceed about 1 volt over the device's fully charged voltage.

4. The method of claim 1, wherein the rechargeable electrochemical energy conversion device is operated at a temperature of at most above 200° C.

5. The method of claim 1, wherein the rechargeable electrochemical energy conversion device includes a cell selected from the group consisting of lithium/organosulfur cells, lithium/(inorganic sulfur) cells, lithium/(metal oxide) cells, lithium/(metal sulfides) cells, and carbon anode cells.

6. The method of claim 1, wherein the tuning species is an organic sulfur compound of the general formula $(R(S)_y)_n$, wherein y is a value between 1 and 6, n is a value between about 2 and 1000, and R is one or more different aliphatic or aromatic organic moieties having between 1 and about 20 carbon atoms, which may include one or more oxygen, sulfur, or nitrogen heteroatoms when R comprises one or more aromatic rings, or one or more oxygen, sulfur, nitrogen, or fluorine atoms associated with the chain when R includes an aliphatic chain, wherein the aliphatic group may be linear or branched, saturated or unsaturated, and wherein either the aliphatic chain or the aromatic ring may have substituted groups thereon.

7. The method of claim 1, wherein the tuning species is an alloying element added to a primary metal component of the negative electrode.

8. The method of claim 1, wherein the tuning species is a surface active agent selected from the group consisting of organoborates, boroxines, polyphosphazenes, phosphates, carbonates, nitrates, and organonitrogen compounds.

9. A method of protecting against damage from overcharge, the method comprising:

providing a rechargeable electrochemical energy conversion device including (a) a negative electrode, (b) a positive electrode, (c) overcharge species produced at the positive electrode which have more than two oxidation states in which the speed of reaction increases with increasing oxidation state, and (d) a tuning species which adjusts the rate at which the overcharge species produced during charging at the positive electrode are reduced and thereby adjusts the voltage at which overcharge protection is provided; and overcharging the rechargeable electrochemical energy conversion device, whereby the overcharge species are oxidized to higher oxidation states at the positive electrode, which overcharge species of higher oxidization state move to the negative electrode where they are reduced back to lower oxidation states to thereby maintain the internal cell potential at a level controlled by the tuning species in conjunction with the overcharge species.

10. The method of claim 9, wherein the overcharge species is an inorganic polysulfide or an organodisulfide compound.

11. The method of claim 9, wherein the overcharge species is a lithium polysulfide or a lithium organodisulfide.

* * * * *